Sept. 24, 1935.  J. W. PEASE  2,015,409
FRUIT FEEDING AND SLICING MACHINE
Original Filed Dec. 19, 1930  8 Sheets-Sheet 1

INVENTOR
John W. Pease
BY
his ATTORNEY

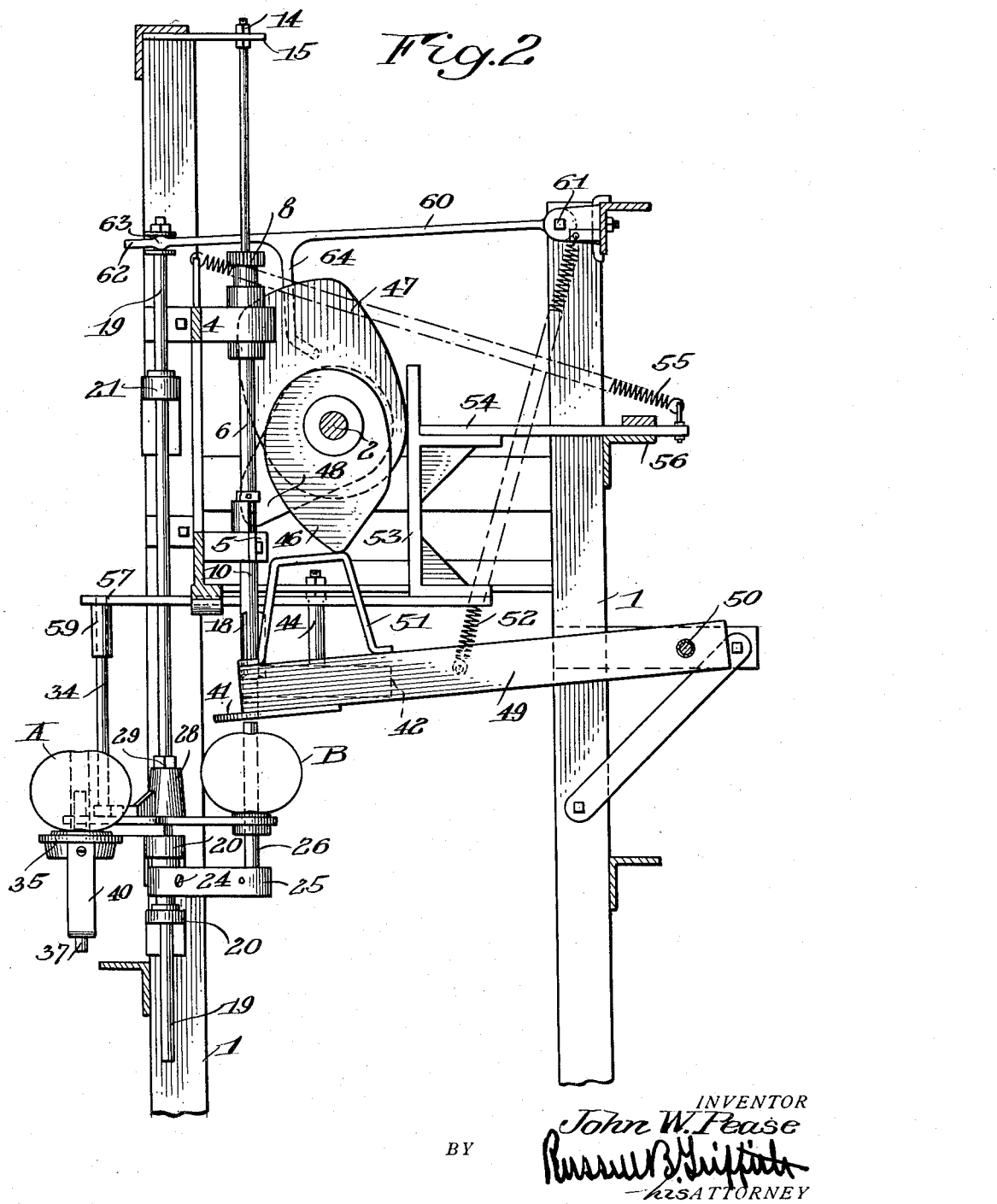

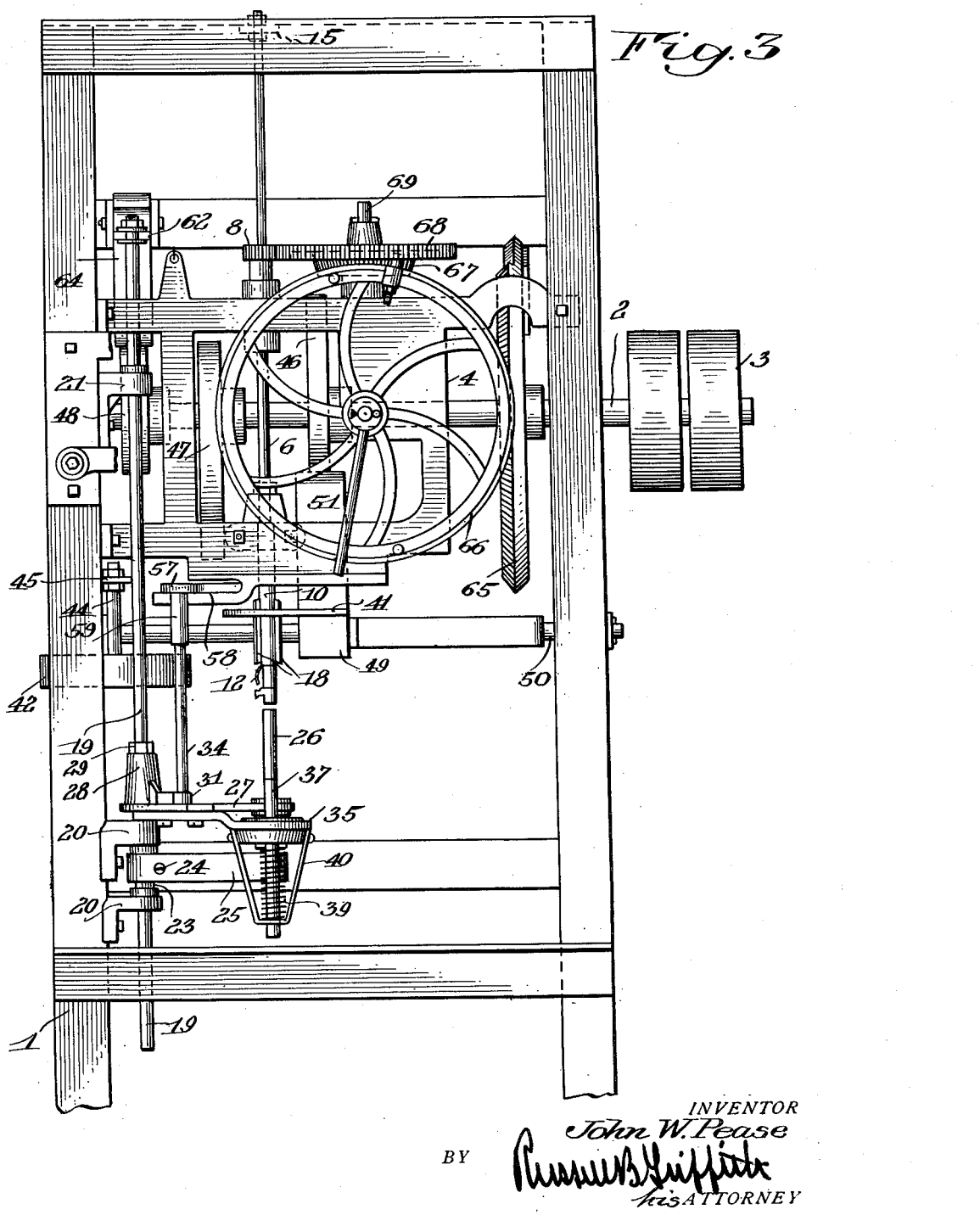

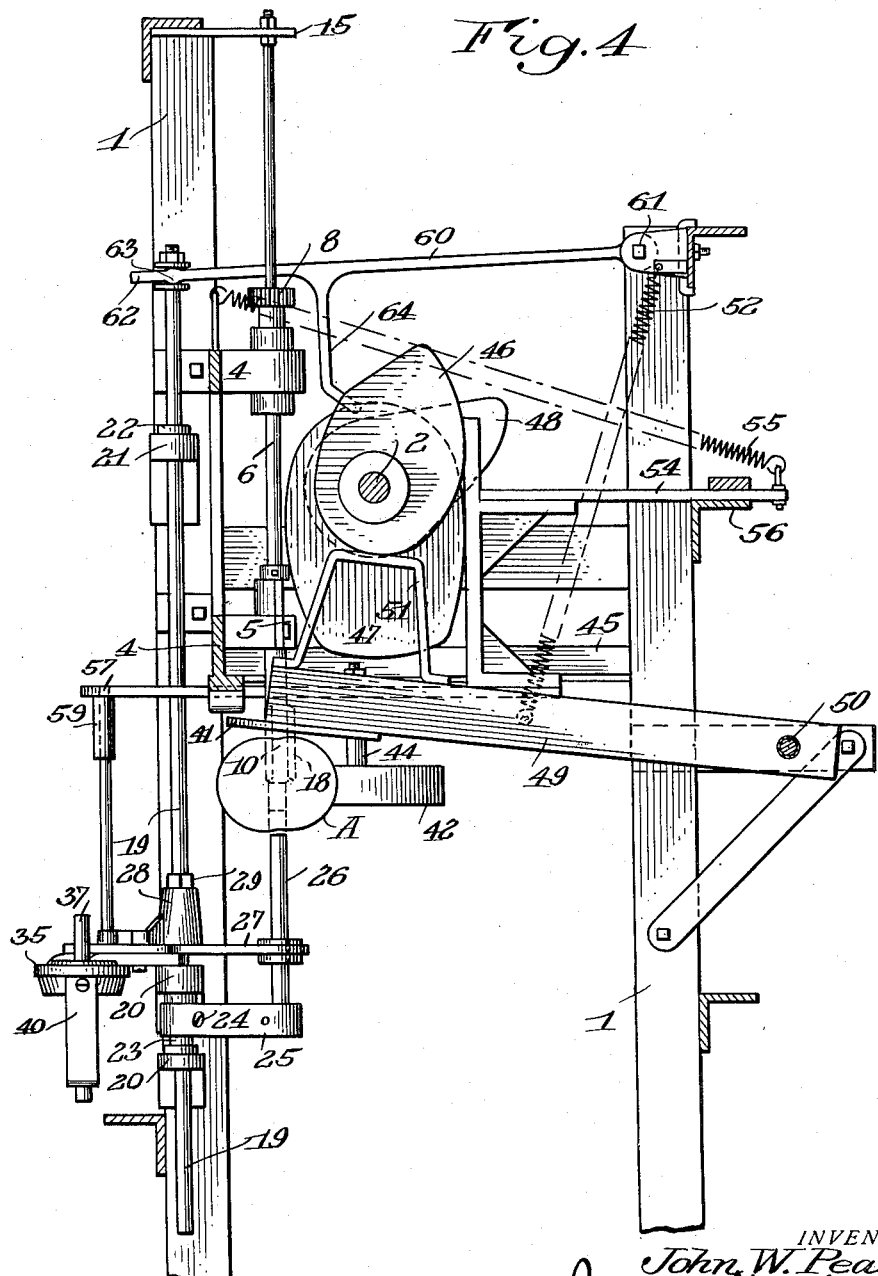

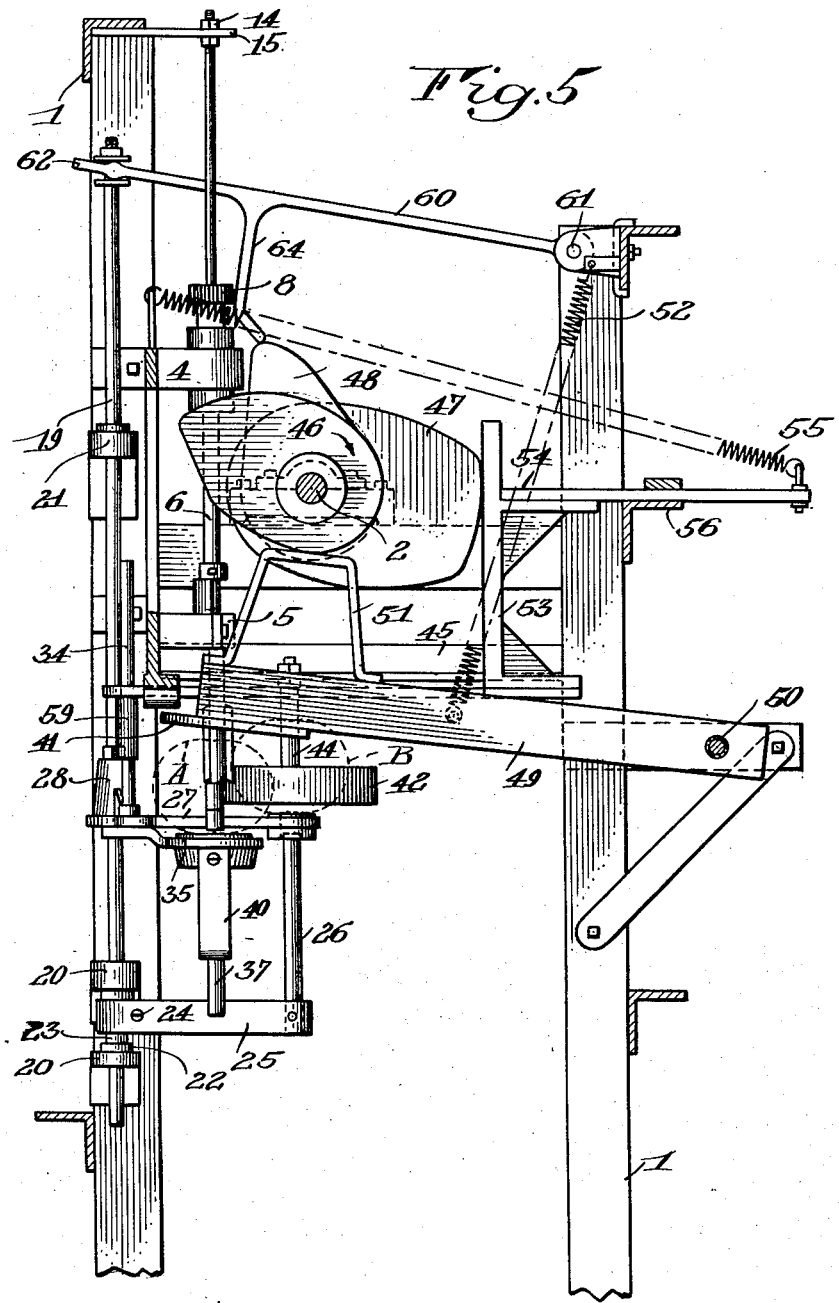

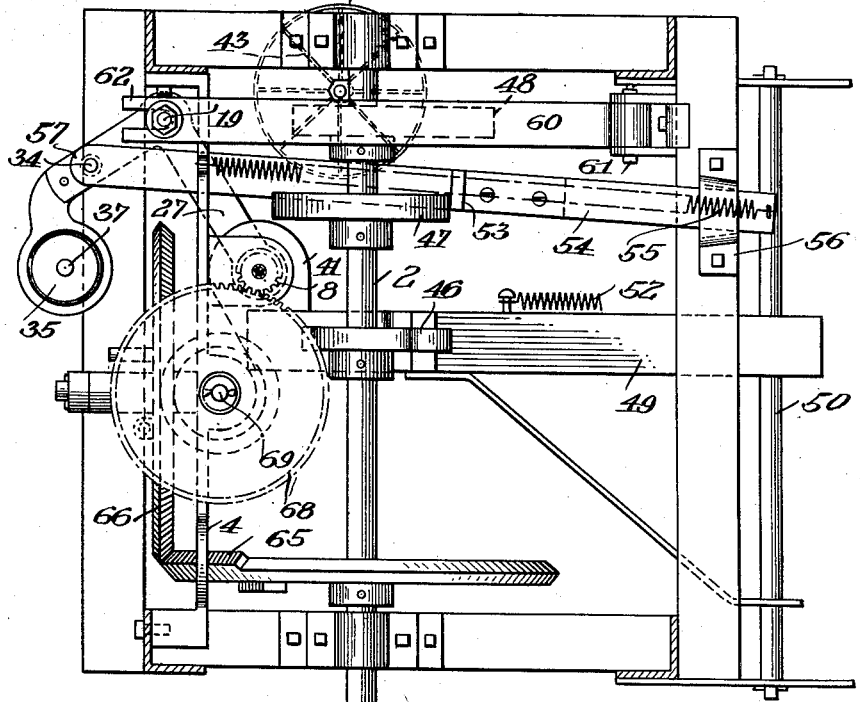
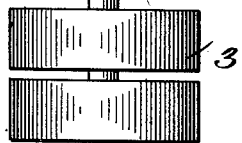
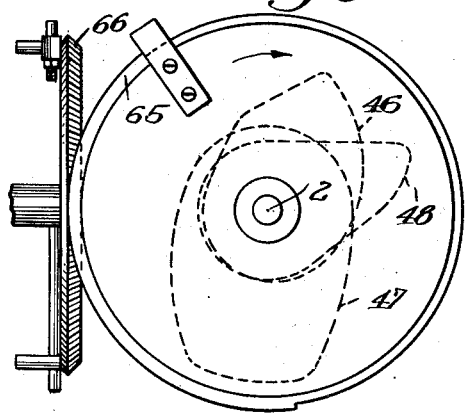
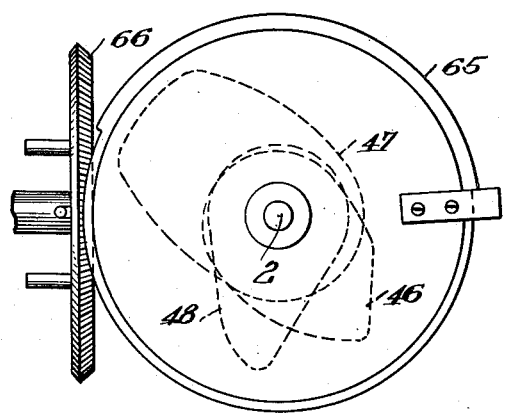

Sept. 24, 1935.    J. W. PEASE    2,015,409
FRUIT FEEDING AND SLICING MACHINE
Original Filed Dec. 19, 1930    8 Sheets-Sheet 7
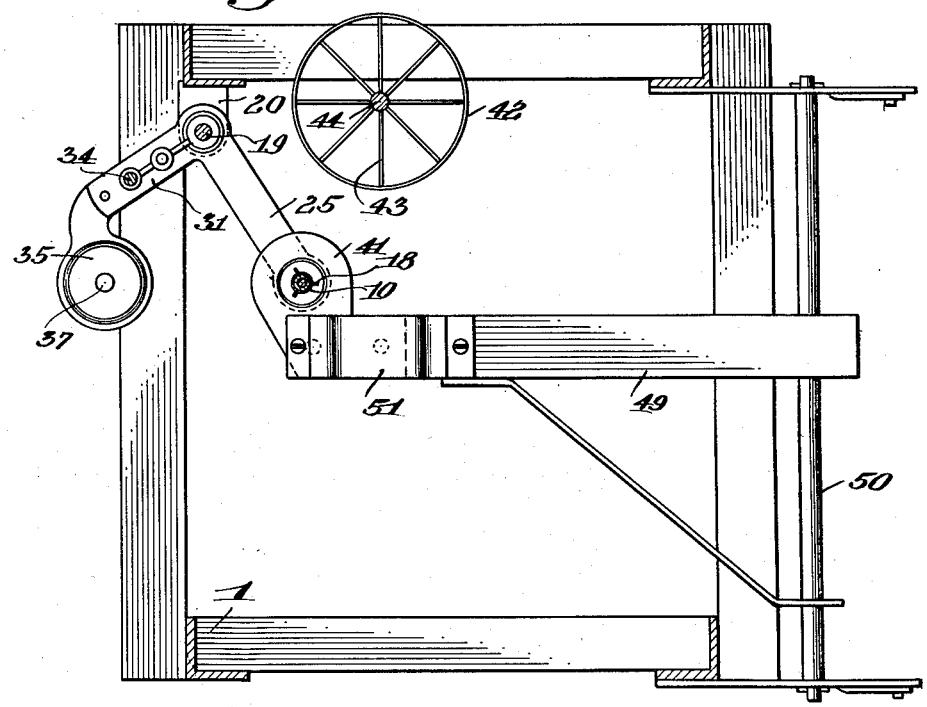
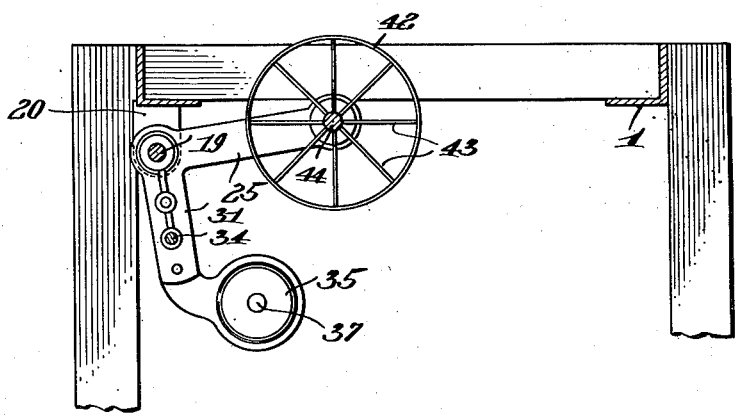
INVENTOR
John W. Pease
BY
his ATTORNEY Sept. 24, 1935. J. W. PEASE 2,015,409
FRUIT FEEDING AND SLICING MACHINE
Original Filed Dec. 19, 1930  8 Sheets-Sheet 8

INVENTOR
John W. Pease
BY
his ATTORNEY

Patented Sept. 24, 1935

2,015,409

UNITED STATES PATENT OFFICE 2,015,409

FRUIT FEEDING AND SLICING MACHINE

John W. Pease, Rochester, N. Y.

Original application December 19, 1930, Serial No. 503,496. Divided and this application August 15, 1931, Serial No. 557,342

9 Claims. (Cl. 146—40)

My present invention relates to machines for operating upon fruits, being adapted more particularly for preparing apples, and it has for its object to produce a simple, efficient and serviceable slicing mechanism for cutting the apples into convenient pieces, as for canning and the making of applesauce. A further object of the invention is to produce a mechanism of this character that may be worked in conjunction and in harmony with related mechanism for performing other operations upon the fruit, such as paring, seed celling, et cetera. The improvements are directed in part also to feeding mechanism through which the fruits are rapidly presented to the slicing knives and transferred thereto from the associated mechanism referred to.

To these and other ends, the invention resides in certain improvements and combinations of parts, all as will be hereinafter more fully described, the novel features being pointed out in the claims at the end of the specification.

In the drawings:

Fig. 2 is a substantially central section taken from front to rear through the machine, showing the fruit handling elements for feeding and for transferring to the slicing element in elevation;

Fig. 3 is a view similar to Fig. 1 with the parts in another position in the cycle of operation;

Fig. 4 is a vertical central section similar to Fig. 2 with the parts in the same position as shown in Fig. 3;

Fig. 5 is a section similar to Figs. 2 and 4, showing the parts in another position in the cycle during which the fruit is being sliced;

Fig. 6 is a top plan view of the working mechanism taken in section through the frame;

Fig. 7 is a horizontal sectional view through the frame at a lower point, showing the fruit handling elements in detail in top plan;

Fig. 8 is a fragmentary view showing parts illustrated in Fig. 7 in another position;

Fig. 9 is an end view of the drive shaft with driving pulleys removed, illustrating its connection with the driven element in one position;

Fig. 10 is a view similar to Fig. 9, showing the parts in another position during the cycle;

Similar reference numerals throughout the several views indicate the same parts.

Figure 1:
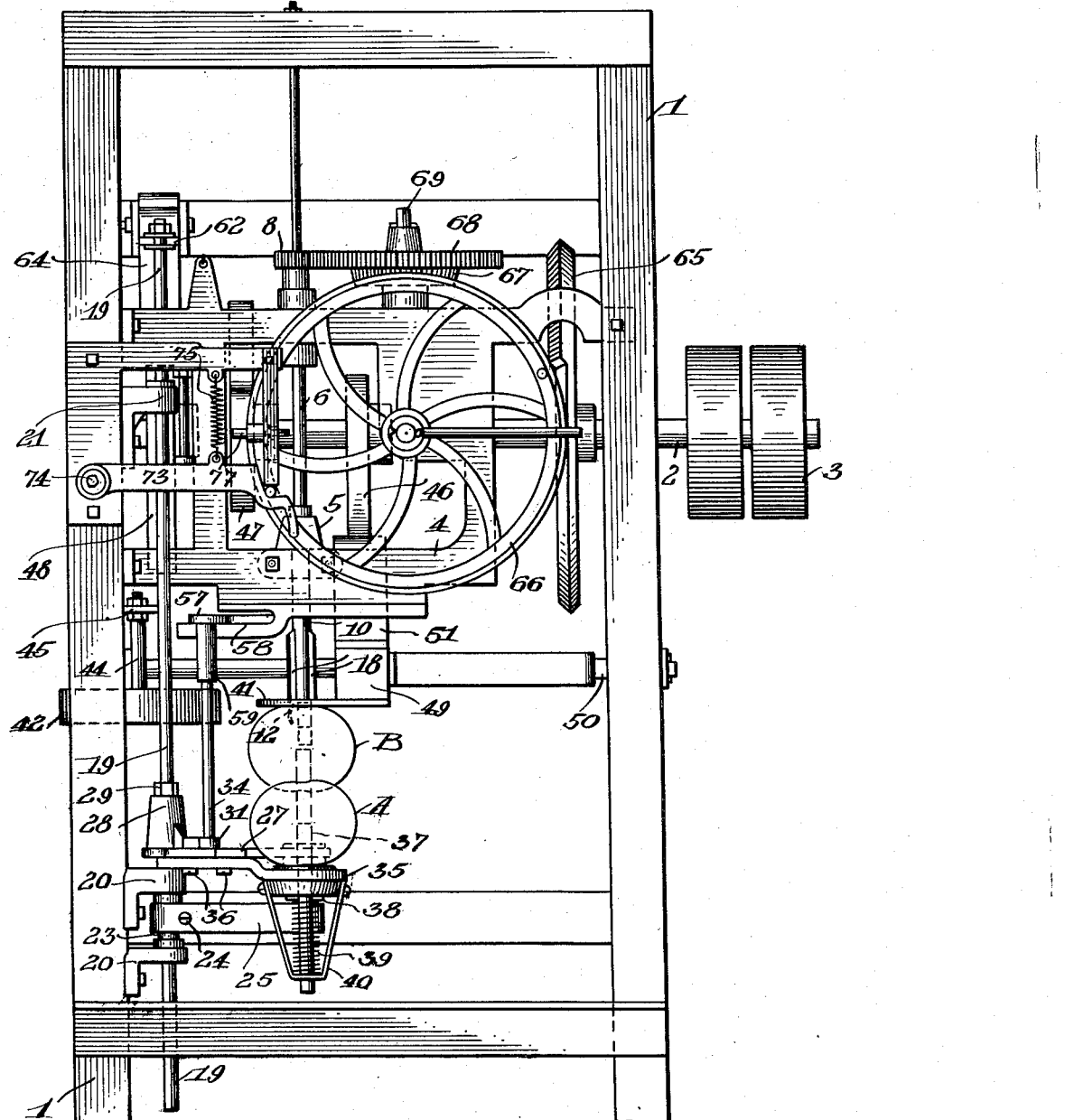
Fig. 1 is a front elevation with the bottom of its frame broken away of a seed removing or celling machine constructed in accordance with and illustrating one embodiment of my invention, the parts being in as near a normal position as is attained, as there is no period of rest with respect to all of the operations.

I have shown and will describe my invention in connection with its specific embodiment in a machine for removing the seeds and seed cells of apples and ultimately delivering them sliced in sectors taken longitudinally of their axes, through the stem and blow ends, as the machine comprises this combination of treatments and functions as offered for commercial purposes, but the seed celling will be only briefly described, as this constitutes the subject matter of my co-pending application, Serial No. 503,496, filed December 19, 1930, of which this is a division. I will first give a general description of the functions of the machine before describing the structure and details with reference to the drawings.

The apples as they come to the machine have preferably been freshly pared and cored, that is, cored in the ordinary sense of the word in this art, which means that a uniform bore has been made through the center, removing the stem and blow and the center of the core. The seed cells radiating from this axis at approximately the geometrical center of the apple occupy a generally globular portion of the interior, so that the coring spoon does not reach the outer tough edges of the cell walls, which remain in the apple, and it is the removal of these by a further operation or treatment that is the problem toward the solution of which this invention and machine is addressed.

The cored apple is placed upon the spindle of a feeding device that swings from a clear and convenient feeding position to one in alinement with a fixed spit or holder. In its next operation, it impales the apple on the spit with which is associated a semi-circular knife of the general curvature of the seed cell body and fixed to an intermittently rotating part. In advance of this knife, as the apple comes upon the spit, is a grooving device that removes a small portion of the interior wall of the core hole to make way for the knife which is then at rest. Subsequently, the knife rotates hollowing out the center of the apple and removing all the fragments of the seed cells, after which the apple is doffed, the curved knife slipping back through the same groove in the core wall.

When so doffed, the apple is received upon an impaling pin or holder that operates to force by successive swinging and rectilinear movements through a slicing spider that ends the dual operations of seed celling and slicing. The parts are so timed that while the celled apple is going through the slicing operation, the next following apple with practically the same movement is being fed and celled, so that after the slicer pin returns empty, it is again in position to receive this apple in turn, at which time the feeder goes out again into receiving position.

Referring more particularly to the drawings, 1 indicates generally an upright rectangular frame, within which the entire mechanism is hung. A main driving shaft 2 provided with pulleys 3 and rotating continuously is mounted transversely of this frame from side to side, but the other shafts, axes and centers of rotary or swinging movement are principally vertical. I shall first describe the elements and instrumentalities that actually handle and work upon the apple with their respective functions and later describe the manner in which they are driven in synchronized or relatively timed movement. In other words, I will first follow the course of the apple through the celling and slicing operations.

Referring first briefly to Figs. 1 and 3, the only part of the seed celling mechanism that need be described herein is a fixed sleeve or extended bushing 18 carried by a bearing bracket 5 on the frame and provided with a plurality of thin, longitudinally extending, radially projecting fins or blades 18. This constitutes a fixed spit or holder for a previously cored apple that is thrust thereon in a manner hereinafter described and seed celled by relatively movable devices, after which it is doffed in a manner that will also be hereinafter described.

Figure 11:
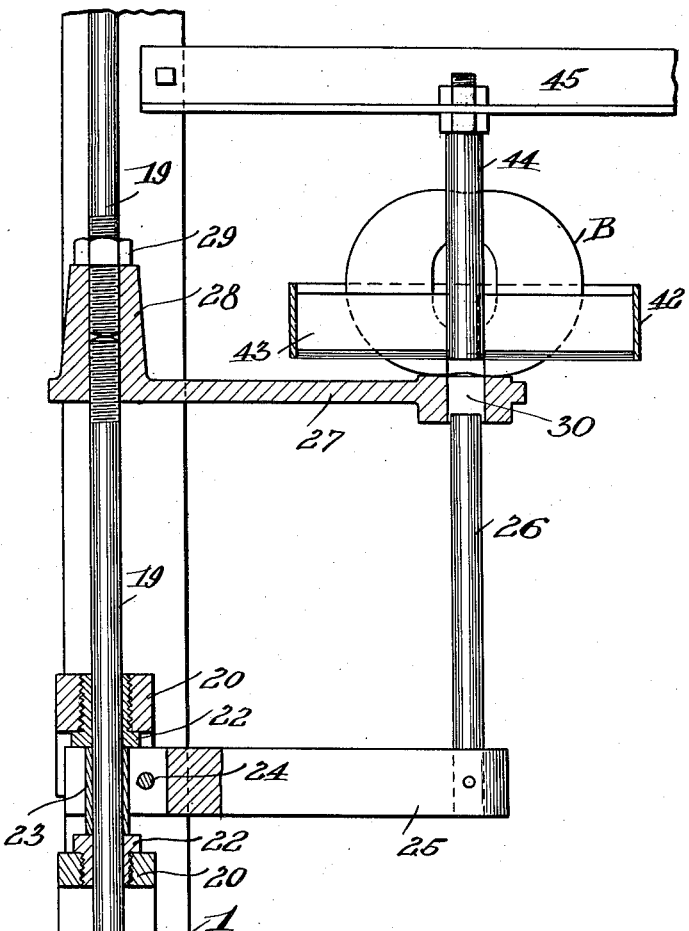
Fig. 11 is a vertical central section, enlarged, through the bearings or mountings of the fruit handling arm.

Referring now additionally to Figs. 7, 8 and 11, there is also mounted in the left front corner of the frame 1 parallel with sleeve 18 a vertically reciprocatory rock shaft 19. It has bearings in lower brackets 20 and an upper bracket 21 on the frame upright. The lower brackets 20 are fitted with bushings 22 between which is confined a sleeve 23 free on the shaft. Clamped to this sleeve by a bolt 24 is an arm 25 fitted with an impaling pin or post 26 at its free end. This is the arm which swings the apple, after seed celling, from the position of that operation to the slicing position. Another co-extensive arm 27 overlying the arm 25 is fixed to rock shaft 19 to swing and reciprocate therewith. In fact, the shaft 19 is preferably made in parts, as shown in Fig. 11, the ends of which are threaded into a boss 28 on arm 27 and locked together and thereto by a jam nut 29. The outer end of arm 27 has an opening 30 fitting over and riding on the impaling pin or post 26, through the medium of which the arm 25, free on shaft 19, may be swung in an arc by arm 27 fixed to rock shaft 19, while arm 27 is also free to slide up and down on impaling pin 26 with the reciprocations of shaft 19.

Figure 12:
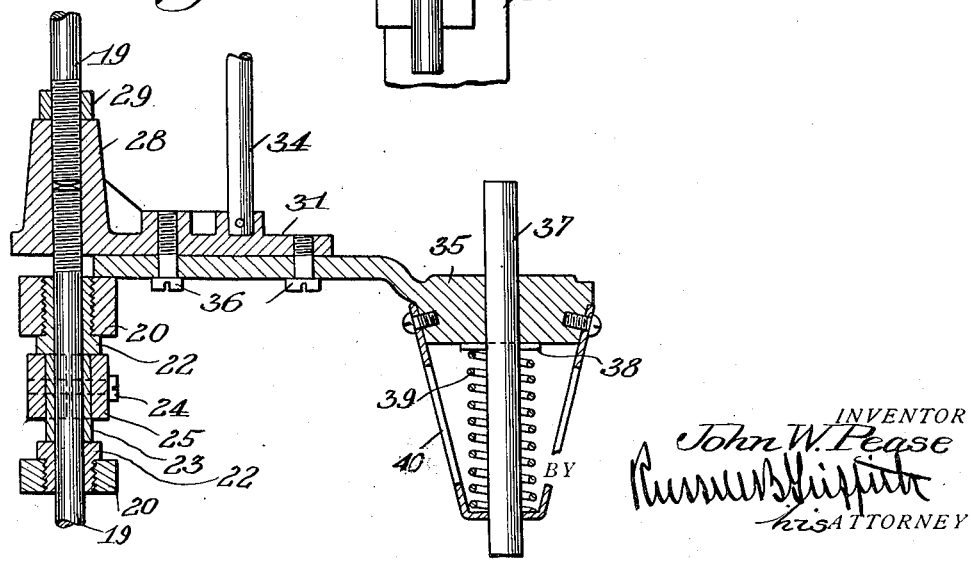
Fig. 12 is an enlarged section taken through the feeding arm and its mounting and bearings.

Above the upper bearing bracket of the pair 20, there is fixed to the shaft 19 at right angles to the arms 25 and 27 an arm 31 (see additionally Fig. 12). The shaft 19 is also parted at this point with the ends of the parts threaded into a boss 32 on arm 31 and secured by jam nut 33. This arm 31 therefore both swings and reciprocates with the shaft 19. In fact, the shaft 19 receives its rocking movement through the medium of this arm which is swung in an arc by means of a post 34 fixed thereto and connected for actuation in a manner that will be hereinafter described. An apple feeding holder 35 is secured to the arm 31 by screws 36 as an extension thereof and hence swings with it from the receiving position of Figs. 1 and 7, for instance, to the delivering position of Figs. 1, 5, and 8 beneath the sleeve or spit 18. As best shown in Figs. 3 and 12, the holder 35 consists, in the present instance, of merely a circular table, from the center of which rises a centering pin 37. This pin is yielding and may be depressed. It extends through the table with a cross pin 38 fixed to it therebelow to limit its upward projection under the influence of a compression spring 39 supported in a depending cage 40 secured to the holder.

With the foregoing description of the devices that actually handle the apple in its complete treatment by the machine, it is believed that a description of the course of the apple or a succession of apples through the machine can now be understood. It is as follows:

The feeding arm and table being in its forward normal position of Figs. 1, 6, and 7, the operator, standing at the front of the machine, places a cored and preferably peeled apple on the pin 37 and table 35. Properly timed actuating mechanism through the medium of the post 34 on the feeding arm swings the latter (rocking the shaft 19) rearwardly to the position of Figs. 3 and 8, in which the pin 37 and the apple are centered in alinement with and below the spit 18 on the celling head. Next, rock shaft 19 slides upwardly in its bearings, carrying the feeding device bodily with it in a stroke of sufficient amplitude to impale the apple (indicated thus far at A in dotted or full lines in several figures) non-rotatably on the spit, as shown in Fig. 5. This upward movement is definite and constant, and the seed celling operation, with which we are not herein interested as to its details, results.

Withdrawal of the celled apple A is effected by means of a doffer 41 consisting, in the present instance, of a plate surrounding the celling head or having an opening through which the head projects. By the time this doffer, from the normal position of Fig. 4, comes down in contact with the top of the apple, the shaft 19 has been rocked in reversed movement and the feeding arm 31 and feeding table 35 carried back to its normal position of Fig. 4, ready to receive the next apple. This brings arm 25 carrying pin 26, which always swings in unison therewith, into the position in alinement with the celling head previously occupied by centering pin 32, as shown in Fig. 4. The apple is hence transferred to the position B by the doffer on pin 26. As the feeding arm makes its next movement rearwardly to feed the new apple A, the preceding apple of position B is correspondingly swung on arm 25 to the position of Fig. 5. It is now below and in alinement with the center of a slicing spider 42 carrying radial blades 43 and mounted in fixed position on a vertical rod 44 bolted to a rail 45 on frame 1. The arm 27 associated with arm 25, but fixed to rock shaft 19, underlies the apple on which the latter in fact rests. As soon as the above alinement is consummated, the rock shaft 19 is drawn upwardly and arm 27 acts as a doffer to lift the apple off of pin 26 and force it through the knives of the spider 42, thus slicing it into sectors which are caught in a suitable receptacle. Concurrently with this, of course, apple A is being alined with and thrust upon the celling head, as previously described.

The actuating mechanism, by means of which the various movable parts hereinbefore referred to are synchronized to act in timed relation and effect the general cycle of operation, will now be described.

Referring first more particularly to Fig. 6 showing them in plan view, there is secured to the constantly rotating drive shaft 2 three cams 46, 47 and 48, the relative shapes of which are best shown in full lines in Fig. 4 and in dotted lines in Figs. 9 and 10. The function of the cam 46 is to operate the doffer plate 41 which is carried by an arm 49 rocking vertically on a pivot 50 on a bracket at the rear of the machine to give it length and hence less curvature to the doffer plate itself. A yoke bracket 51 on top of the arm makes contact with cam 46 against which it is held and by which it is raised through the tension of a spring 52 connected to the arm and to the frame. In Fig. 3, the arm contact is just leaving the low point of the cam, while in Fig. 2, it is on the high point, after having completed the doffing movement and transferred the apple B from the celling head to the slicer pin.

Cam 47 is connected to communicate the swinging movement to the feed arm 31 and the slicer arm 25. To this end, it engages the vertical face 53 of a reciprocatory frame 54 held thereagainst and movable forwardly under the influence of a spring 55 connected to this frame and to a fixed part. It is guided at the rear in a bracket 56 on the rear of the machine, while a forward extension 57 pivots on the post 34, heretofore described as fixed on feeder arm 31. The arcuate movement of this arm prevents a true reciprocatory movement of the frame 54—57, but it is substantially rectilinear because of the frame and the variable is provided for by a slotted bearing 58 in the cross frame 4, in which extension 57 rests, as clearly shown in the front elevations. The pivotal connection with post 34 is through a bearing sleeve 59 fixed to extension 57, so that when the feeding arm rises, as in Fig. 5, to impale the apple upon the feeding head, the post 34 will slide through its actuating frame extension.

The cam 48 serves to raise and lower rock shaft 19 to carry the feeder arm 31 and the slicer arm 27 toward and from the celler head and the slicer respectively and in unison, as described. To this end, a vertically rocking lever 60 pivoted to the rear of the frame 61 has a bifurcated forward end 62 embracing shaft 19 and making a rocking bearing therewith at 63. The arm and shaft lower themselves by gravity, in the present instance, and contact is made with the cam 48 through a depending finger 64 on the under side of the arm riding thereon. In Fig. 2, the arm and shaft are shown lowered, the cam having left contact, while in Fig. 5, they are raised to the maximum, the finger riding on the high point of the cam.

As before stated, it is immaterial to the operation of the slicing mechanism whether the apple received from the spit 10 by the transfer or feeding device has been seed celled, pared or otherwise treated, so that it is unnecessary to describe the celling mechanism beyond stating that a shaft 6 extending through and intermittently rotated relatively to the spit 10 carries the celling knife 12 and is turned through a pinion 8 secured on such shaft 6 and driven by gears 68, 67, 66, and 65, the latter being an interrupted gear carried on shaft 2.

I claim as my invention:

1. The combination with a cutting head embodying a fruit holder and a knife associated therewith, one of which is rotatable relatively to the other, of means for intermittently driving the rotatable member, a fixed slicing device arranged in an offset position relatively to the axis of the head, a transfer device adapted to receive a fruit from the head and reversely movable in an arcuate path from a position in alinement with the latter to one in alinement with the slicing device, and means for actuating the transfer device in timed relation to said driving means.

2. The combination with a cutting head embodying a fruit holder and a knife associated therewith, one of which is rotatable relatively to the other on a vertical axis, of a fixed slicing device arranged in an offset position relatively to the axis of the head, a transfer device adapted to receive a fruit from the head and reversely movable in an arcuate path from a position directly beneath the latter to one directly beneath the slicing device, and means for raising the fruit from the transfer device and thrusting it through the slicing device.

3. The combination with a cutting head embodying a fruit holder and a knife associated therewith, one of which is rotatable relatively to the other, of a fixed slicing device arranged in an offset position relatively to the axis of the head, and a transfer device adapted to receive a fruit from the head and reversely movable in an arcuate path from a position in alinement with the latter to one in alinement with the slicing device.

4. The combination with a fruit cutting device, of a fruit supporting device movable reversely into and out of alinement therewith, and a separate transfer element cooperating with the fruit supporting device to carry the fruit therefrom to the cutting device.

5. The combination with a cutting head embodying a fruit holder and a knife associated therewith, of a slicing device arranged in an offset position relatively to the head, a feeding device movable into and out of cooperation with the head to present a fruit to the holder, a transfer device reversely movable into and out of cooperation with the head and into and out of cooperation with the slicing device to receive the fruit from the head and present it to the slicing device, and synchronized actuating mechanism for the feeding device and the transfer device to alternate their movements into such cooperation with the head.

6. The combination with a cutting head embodying a fruit holder and a knife associated therewith, of a feeding device and a transfer device adapted to swing reversely together in arcuate paths into and out of alinement with the fruit holder to alternately and respectively present a fruit thereto and receive a fruit therefrom, a slicing device having a fixed offset position with respect to the cutting head and holder, and means for moving a fruit on the feeding device axially toward the holder and the fruit on the transfer device axially toward the slicer concomitantly.

7. The combination with a cutting head embodying a fruit holder and a knife associated therewith, and a slicing device arranged in an offset position with respect to the head, of a rock shaft having an axial reciprocatory movement parallel with the axis of the head and the slicing device, a feeding arm and a transfer arm on the rock shaft adapted to swing together in arcuate paths into and out of alinement with the fruit holder to alternately and respectively present a fruit thereto and receive a fruit therefrom, the transfer arm being in alinement with the slicing device when the feeding arm is in alinement with the fruit holder, and means operating at the latter point in the cycle of movement to impart axial movement to the rock shaft to concomitantly carry one fruit axially toward the holder and the other toward the slicer.

8. The combination with a slicing spider for fruit, of an arm having a post thereon adapted to swing into and out of alinement with the spider, a second arm arranged to swing with the first and to reciprocate upon the post, means for imparting the swinging movement to the arms, and means for reciprocating the second arm relatively to the first to disengage a cored fruit from the post and force it through the spider.

9. The combination with a fixed fruit slicing device, and a fruit supporting device normally offset laterally therefrom, but adapted to move reversely into and out of alinement with the slicing device, said supporting device embodying an impaling pin, of means for moving an apple from the pin into the slicing device when so alined.

JOHN W. PEASE.